Aug. 5, 1958  C. G. CHAMBERS ET AL  2,846,379
PLATING EQUIPMENT AND METHOD OF PLATING PISTON RINGS
Filed June 14, 1951
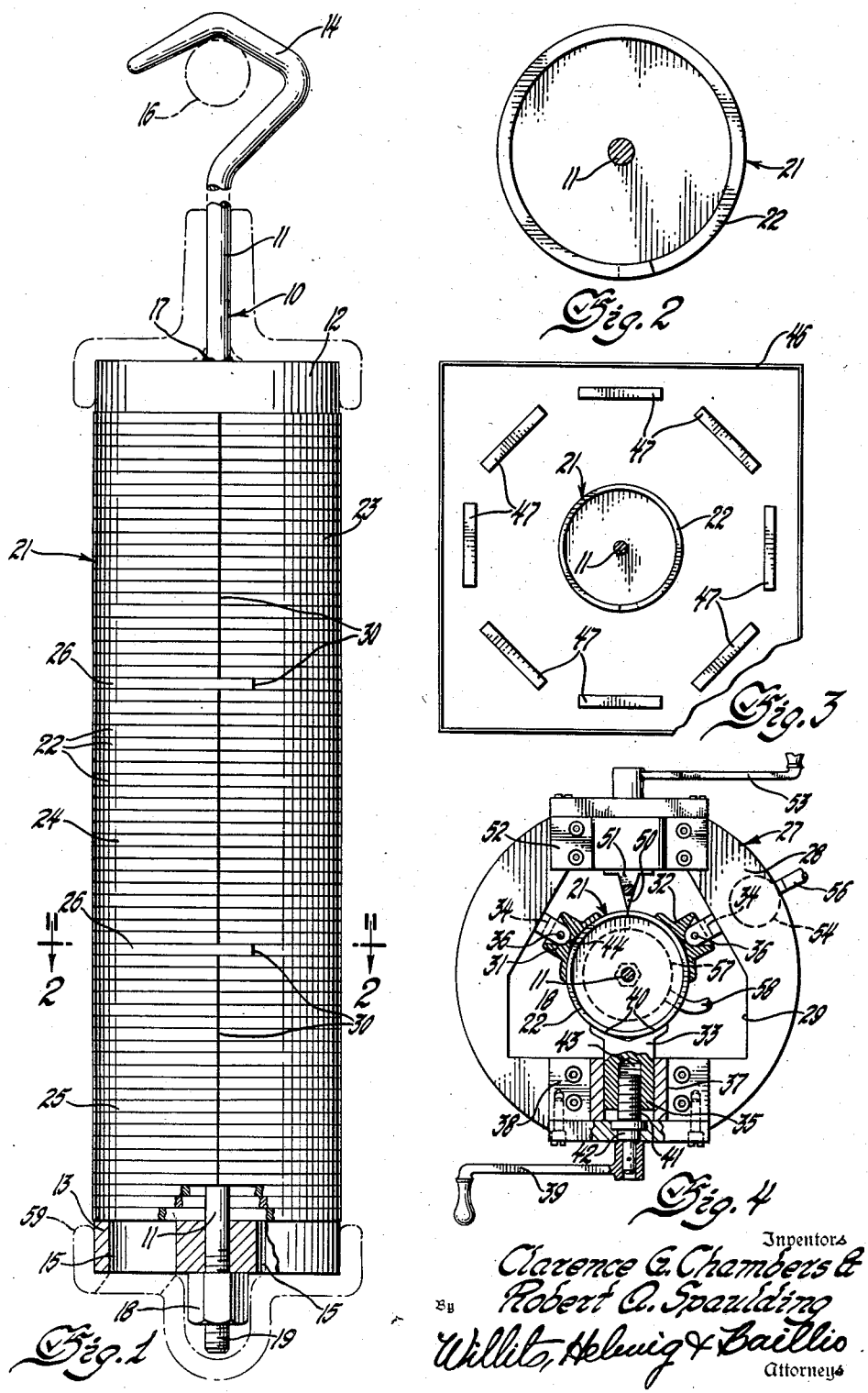
Inventors
Clarence G. Chambers &
Robert O. Spaulding
By Willits, Helwig & Baillio
Attorneys

United States Patent Office 2,846,379
Patented Aug. 5, 1958

2,846,379

PLATING EQUIPMENT AND METHOD OF PLATING PISTON RINGS

Clarence G. Chambers, Ypsilanti, and Robert A. Spaulding, Huntington Woods, Mich., assignors to General Motors Corporation, Detroit, Mich., a corporation of Delaware Application June 14, 1951, Serial No. 231,476

5 Claims. (Cl. 204—25)

This invention relates to piston rings and has particular relation to a novel method of and apparatus for plating the exterior surfaces of split rings adapted to be employed as piston rings for resilient engagement between the pistons and the cylinders of internal combustion engines and for other purposes.

An object of the invention is to provide a novel method of and apparatus for plating piston rings with chromium or other suitable plating material and in such manner that the rings will be held during the plating operation with the exterior surfaces thereof forming a desired configuration which differs somewhat from that of the interior surface of a cylinder with which the rings are to be employed.

Another object of the invention is to provide a method of and an apparatus for plating piston rings with the ends of the rings in abutting or other fixed and closely spaced relation, thereby preventing the sharp exterior edges of the rings at or adjacent the ends thereof from being insufficiently, excessively or non-uniformly plated.

Another object of the invention is to provide a method of and an apparatus for loading a stack of piston rings in a plating fixture in such manner that each of the rings will be distorted from the normal configuration of the rings and with the gaps therein either closed or the ends held in fixed relation to one another. With the rings so distorted when loaded in the plating fixture, it will be apparent that any expansion of the rings in the stack will first cause the rings to conform to the normal circular configuration thereof before the abutting or other fixed relation of the ends of the rings is changed.

Another object of the invention is to provide a method of loading a long stack of rings in a fixture with the gaps of the rings in different groups of the rings being aligned in each group but not in the same alignment in all groups.

Another object of the invention is to provide a method of and an apparatus for compensating for the slight differences in the size of different piston rings in a stack of piston rings to be plated, so that such differences in size will be distributed uniformly throughout the entire exterior surface of the stack and therefore will not result in non-uniform plating of adjacent rings of different size in the stack.

Another object of the invention is to provide a method of and an apparatus for loading a stack of piston rings in a fixture for plating the rings, with the rings distorted in such manner as to elongate the rings between the gaps in the rings and the parts thereof which are diametrically opposed to the gaps.

Another object of the invention is to provide a plating fixture and an apparatus for loading the plating fixture which can be readily employed during a plating operation to establish and retain the desired external configuration of a stack of rings and the desired relation of the ends of the rings.

It is proposed to employ a fixture for plating a stack of rings with the rings clamped in the fixture in rigid relation to one another between end plates or members engaging the rings at the opposite ends of the stack. The rings are loaded and confined within the fixture in such manner that each ring is distorted out of its normal shape by elongating the rings between the gaps in the rings and the parts of the rings diametrically opposed from the gaps. It is further proposed to elongate and distort the rings by compressing the sides of the rings inwardly, thereby compressing the ends of the rings into resilient engagement or a fixed relation to one another so that the rings in the stack may expand in the fixture without changing the established relation between the ends of the rings. It is further proposed frictionally to bind the rings in a long stack of rings by disposing the gaps in some of the rings in such a way as to be out of alignment with the gaps of other rings in the stack, thereby to hold the ends of the rings together throughout the length of the stack by the pressure applied to the ends of the rings by the distortion of the rings as previously described.

For a better understanding of the invention, reference may now be had to the accompanying drawing forming a part of the specification, in which:

Figure 1 is an elevational view having parts thereof in cross-section, of a plating fixture having a stack of rings supported therein, the external configuration of the rings and the relation of the ring ends being established according to the principles of the invention.

Figure 2 is a cross-sectional view of the stack of rings and the plating fixture disclosed by Figure 1 as the fixture and rings would appear substantially in the plane of line 2—2 on Figure 1.

Figure 3 is a diagrammatical illustration of a plating tank showing the relation of the anode and cathode means employed in the operation of plating piston rings according to the invention.

Figure 4 is a diagrammatical illustration of a loading apparatus for use in loading a stack of rings in the fixture illustrated by Figure 1.

Figure 1 discloses the plating fixture 10 comprising a rod 11 on which end members or circular discs or plates 12 and 13 are secured in spaced relation. The rod 10 has a hook or other hanging means 14 formed at the upper end thereof which is adapted to engage a plating electrode indicated in dot-and-dash lines at 16. The electrode 16 serves as an electrical conductor in the electro-plating operation to be employed and to support the fixture 10 during the electro-plating operation. The end member 12 is adapted to be rigidly secured to a part of the rod adjacent the hook 14 as by welding or other suitable means indicated at 17. The end member 13 is adapted to be removably supported upon the rod 11 by a nut 18 adapted to engage threads 19 formed on the end of the rod 11. A stack 21 of individual piston rings 22 is adapted to be clamped between the end members 12 and 13 with the external surfaces of the rings forming a desired configuration for plating the rings. Openings 15 are provided in the members 12 and 13 to provide for the circulation of plating fluid through the fixture 10. The diameter of the end members 12 and 13 is appreciably less than the diameter of any opposed parts of the surface of the ring stack 21, so that the ring stack can be deformed to the desired configuration without interference by the surface of the members 12 and 13.

It is proposed to hold the rings 22 within the fixture 10 with the external surface of one ring forming as nearly as possible a continuation of the external surfaces of adjacent rings. It is also proposed to hold the rings with the ends of the rings in fixed relation to one another so that the sharp edges at the ends of the rings will be uniformly spaced throughout the length of the stack. This may be accomplished either by clamping the ends of the rings together or by clamping the ends of the rings upon spacing means of uniform thickness throughout the length of the stack. It has been found that when the rings are not so held, the plating of the rings at or adjacent the ends thereof may vary throughout the length of the stack.

Figure 1 illustrates a relatively long stack 21 of individual rings 22 assembled in the fixture 10 for plating. When the stack of rings is long it may be found desirable to break the stack up into groups of rings with the gaps in each group of rings in alignment with one another, but with the gaps in adjacent groups of rings slightly out of alignment with one another. The numerals 23, 24, 25 and 26 indicate such groups of rings, there being a plurality of rings in the groups 23, 24, and 25 and only a single ring in each of the groups 26. While it will be apparent that the invention may be practiced by dividing the rings into any number of groups, the rings in the stack 21 have been divided into the groups illustrated to facilitate stacking the rings with a large number of rings in different groups in alignment with one another. The lines 30 indicate the closed gaps at the ends of the rings throughout the different groups of rings, the gaps 30 being closed either by pressing the adjacent ends of the rings together or by pressing the rings together upon some uniform spacing means which it may be desired to employ. The gaps 30 in the rings in the groups 23, 24 and 25 are aligned with respect to one another throughout the length of the stack 21 and the alignment of the gaps in all of the rings throughout the length of the stack is broken by slightly turning around the gaps in the rings in the groups 26.

It will be apparent that friction between the engaging surfaces of the rings in the groups 26 will tend to prevent variation in spacing between the ends of the rings in groups 23, 24, and 25 when the rings are clamped between the end members 12 and 13 of the fixture 10.

In order to be able to secure the rings in the stack 21 within the fixture 10 and with the external surfaces and ends of each ring in the desired relation throughout the length of the stack 21, there is provided a clamping or loading device or apparatus indicated at 27. The device 27 comprises a support 28 having an opening 25 formed therein in which clamping members 31, 32 and 33 are secured in spaced and parallel relation to one another and in such manner as to be parallel to and equally spaced about the axis of a ring stack 21 to be assembled upon the fixture 10 and within the device 27. The clamping members 31 and 32 are pivotally mounted intermediate the ends thereof on pins 36 secured between the bifurcated ends of brackets 34 which in turn are rigidly secured to the support 28. It will be apparent that the pins 26 upon which the clamping members 31 and 32 are pivoted, are somewhat farther apart than the diameter of the exterior surface of the ring stack 21 which is adapted to be assembled within the fixture 27.

The clamping member 33 is mounted for radial movement with respect to the ring stack 21 and toward a position between the pins 36 supporting the clamping members 31 and 32. For so mounting the clamping member 33 the support 28 is provided with a bracket 38 having spaced guides 37 for slidably receiving the parallel sides of a guide member 35 projecting laterally from an intermediate portion of the guide member 35. The clamping member 33 may be moved with respect to the clamping members 31 and 32 by a crank 39 which is rigidly secured to the end of a shaft rotatably mounted at 42 in the bracket 39. The threaded end of the shaft indicated at 41 is adapted to be received in a threaded opening 43 formed in the member 35 projecting from the clamping member 33.

The ring stack 21 is adapted to be disposed in the fixture 27 with the open and aligned gaps in diametrically opposed relation to the middle of the clamping member 33. The gaps in the rings are adapted to be accurately aligned and retained in accurate alignment during the compression of the rings by the clamping members 31, 32 and 33, by an aligning member 51 having a knife blade shape edge projecting toward the axis of the ring stack 21 and adapted to be projected within the gaps in the rings for accurately aligning the gaps and while the gaps are being closed by operation of the crank 39. The aligning device 51 extends throughout the length of the ring stack 21 and is adapted to be supported intermediate the ends thereof by a bracket 52 secured to the support 27 which may be in all essential respects similar to the bracket 38 employed in supporting the clamping member 33. The aligning member 51 therefore may be provided with a support member projecting within the bracket and which operatively engages the threaded end of a shaft rotatably secured within the bracket 52 and operated by a crank 53. The fixture 27 also may be provided with an air actuated vibrating cylinder 54 which is secured to one side of the support 28 and the vibrating piston in which is adapted to be operated by compressed air supplied to an air hose or conduit indicated at 56. An air motor indicated at 57 also may be suspended in any suitable manner beneath the fixture 27 for the purpose of providing power actuated means for tightening the nuts 18 upon the fixtures 10 when successive fixtures 10 are loaded with rings within the fixture 27. The air motor 57 may be supplied with compressed air through an air conduit indicated at 58.

The ring engaging surfaces of the clamping members 31, 32 and 33 are formed with angularly disposed plane faces indicated at 44 to provide for engagement between the clamping members and the ring stack 21 only adjacent the oppositely disposed rectilinear edges of each of the clamping members 31, 32, and 33.

It will be apparent that by turning the crank 39 it will be possible to contract the clamping members 31, 32 and 33 upon a ring stack indicated at 21. A ring stack 21 consisting of a plurality of normally expanded rings may be loaded in the fixture 27 with the gaps therein approximately aligned throughout the length of the stack, by employing a sheet metal form having an outwardly projecting part extending from one end to the other thereof for positioning the gaps in the rings in approximate alignment with one another. The rings in the stack may be disposed on the exterior surface of the form and then the rings and the form inserted within the clamping jaws 31, 32 and 33. By operating the crank 39, the jaws may be moved with respect to one another until they engage all of the rings in the stack and thereafter the form may be removed and the ring stack retained within the jaws by the resilient engagement between the rings and the jaws. The crank 53 thereafter may be operated in such a way as to project the aligning member 51 into the gaps in the rings as far as it will go without applying excess pressure to the crank 53. The rings in the stack 21 thereafter may be contracted until the ends of the rings engage one another or any spacing means employed, by simultaneously operating the cranks 53 and 39 and the vibrating cylinder 54. The vibrating cylinder 54 will cause the entire fixture 27 to vibrate at a high frequency, thus causing the rings in the stack 21 to vibrate with respect to one another for the purpose of overcoming the frictional resistance between the rings and between the rings and the clamping jaws 31, 32 and 33. The vibration of the rings will cause the ends of the rings to be brought into perfect alignment on each side of the aligning member 52 and will tend to cause the rings to be loosened with respect to the aligning member 51. Thereafter the crank 53 may be turned in such a way as to withdraw the aligning member 51 as the crank 39 is turned to move the clamping jaw 33 inwardly with respect to the clamping jaws 31 and 32. As the outward movement of the aligning device 51 continues in timed relation to the inward movement of the clamping jaw 33 a position will be reached where the aligning device 51 is removed from between the ends of the rings in the stack. If it is not desired to have the rings engage at the ends, then spacing means in the form of lead foil or other suitable spacing means may be inserted between the accurately aligned and slightly spaced ends of the rings and the rings then may be contracted upon such spacing means by further turning the crank 39.

The gaps 30 in the rings in the groups 26 also may be turned around at this time so as to be out of alignment with the gaps in the groups of rings 23, 24 and 25. However, notches 50 may be cut transversely in the aligning member 51 and directly opposite the rings 26, the gaps in which it may be desirable to turn with respect to the gaps in the remaining rings in the ring stack. If such notches are provided, then the rings 26 may be turned around before the aligning member 51 is removed and while the rings in the stack 21 are under only a slight amount of pressure within the jaws 31, 32 and 33.

After the aligning member 51 has been entirely removed from the gaps in the rings in the stack 21 it will be possible to distort the rings out of the normal configuration of the rings by further rotating the crank 39. Such further rotation of the crank 39 will tend to cause the clamping jaw 31 to rotate in a counterclockwise direction upon its pin 36 and the clamping jaw 32 to rotate in a clockwise direction upon its pin 36. Such rotation of the clamping jaws 31 and 32 will tend to press inwardly upon the sides of the rings in the stack 21 in such manner as to elongate each of the rings upon an axis extending through the adjacent ends of the rings and the parts of the rings diametrically opposed to such ends. It is proposed to considerably tighten the crank 39 so that the rings will be considerably elongated in the manner described.

The rings in the stack 21 thereafter may be compressed between the end members 12 and 13 of the fixture 10 by discontinuing the operation of the vibrating cylinder 54 and by operating the air motor 57 to tighten the nut 18 upon the lower end of the rod 11. Considerable power should be applied by the motor 57 in tightening the nut 18 so that the rings in the stack 21 will be rigidly clamped with respect to one another between the end members 12 and 13. When the end members 12 and 13 are sufficiently tightened upon the ring stack 21, the entire fixture 10 may be removed from the fixture 27 by loosening the crank 39 and elevating the fixture 10 from within the clamping jaws 31, 32 and 33.

When the fixture 10 has been so removed from the fixture 27, there will be a tendency for the rings in the stack 21 to move in such a way as to decrease the elongation of the rings caused by the final turning movement of the crank 39. Such tendency of the rings to move out of such elongated positions will be opposed by the friction between the engaging surfaces of the rings and the effect of such frictional resistance to movement of the rings will decrease from both ends of the stack 21 toward the middle of the stack. It will be apparent, however, that the gaps in the rings in the stack 21 will not open until all of the elongation of the rings caused by the final tightening movement of the crank 39 has been eliminated from each of the rings and that the removal of such elongation will occur progressively from the rings adjacent the end of the stack toward the rings adjacent the middle of the stack.

If the rings are sufficiently elongated within the fixture 27 before the stack of rings is rigidly clamped within the fixture 10 then some elongation will remain in all of the rings in the stack notwithstanding the tendency of the rings to expand into the normal configuration of the rings and after the fixture 10 has been removed from the fixture 27. The rings 26 which have the gaps therein out of alignment with the rings in the stacks 23, 24 and 25 will further tend to oppose the expansion of the rings in the stack 21 into the normal configuration of each of the individual rings in the stack, by dividing the stack 21 into a plurality of stacks of rings in the groups 23, 24, and 25. Each stack of rings in the groups 23, 24 and 25 therefore will be clamped together in such a way that the frictional resistance between the rings in each of the groups 23, 24 and 25 will tend to oppose movement of the rings from the ends toward the middle of each of the groups of rings 23, 24 and 25. The turning of the rings 26 therefore makes it possible to plate longer stacks of rings within a fixture such as that indicated at 10 without elongating the rings to such an extent as would otherwise be required for preventing separation between the ends of all the rings in such a long stack of rings.

It will also be apparent that any inequality in the length of the rings will not appear in the form of a variation in the width of the gaps in the rings. The ends of the rings will all be uniformly disposed with respect to one another and such inequalities in the lengths of the rings will be distributed throughout the entire circumference of each ring. Such distribution of any inequalities in the length of the rings will therefore not produce an appreciable variation in the exterior surface of the rings nor in the position of the ends of the rings and consequently the surfaces and ends may be relatively uniformly plated.

After the fixture 10 has been removed from the fixture 27, the ring stack 21 may be externally plated by suspending the fixture 10 upon an electrode 16 projecting across a tank such as that indicated at 46. When so suspended, the fixture and the stack of rings will be immersed within the plating bath adapted to be contained within the tank 46. Any suitable chromium or other plating solution may be contained within the tank 46 as for example, a chromic acid sulphate solution such as ordinarily is employed in chromium plating. The fixture 10 should be suspended within the tank 46 concentrically with respect to a plurality of circumferentially disposed anode members indicated at 47. The anode members 47 are adapted to remain within the tank and are supplied with electrical energy by connection to a suitable electrode, not shown. Fixture 10 becomes the cathode in the operation of the plating of the external surfaces of the rings 22 in the stack 21 and the plating may be practically entirely limited to the external surfaces of the rings by suitably masking the members 12 and 13, the nut 18 and the opposite ends of the rod 19 by employing non-conductive masking members such as those indicated in dot-and-dash lines in Figure 1.

It will be apparent that fixture 10 may be reloaded with successive stacks of rings by operating the fixture 27 in a manner previously described and that successive stacks of rings may be plated upon the fixture 10 when so loaded by repeating the plating operations described.

It will also be apparent that it is not necessary to use actual piston rings in breaking the stack of rings into a plurality of groups of rings with aligned gaps. For example, instead of employing piston rings in the groups indicated at 26, it will be apparent that continuous rings of substantially the same external dimensions as piston rings, may be employed in these locations. These continuous rings will provide the frictional force necessary to prevent the gaps in the aligned rings in the ring stack from separating.

We claim:

1. A process for use in making split resilient piston rings having gaps between the peripheral ends thereof and comprising, axially disposing a plurality of said rings between a pair of end members with said rings being free to distort inwardly throughout the entire extent of the inner peripheral surfaces thereof and providing a cylindrical ring stack, relatively moving a plurality of clamping jaws with respect to and against the exterior surfaces of said rings and said stack and closing the gaps in said rings, continuing the movement of said clamping jaws upon said stack and radially distorting and transversely elongating said rings on axes extending through the closed gaps between said peripheral ends of said rings, clamping said end members rigidly together upon said stack and applying axially disposed forces of sufficient magnitude to the engaging surfaces of said rings to frictionally retain said rings in the form established by distorting and elongating said rings, loosening said clamping jaws from said rings, and thereafter plating said rings in the form established by said clamping jaws and retained by said end members.

2. A process for use in plating split resilient piston rings having gaps between the peripheral ends thereof and comprising, holding a ring by forces applied to the outer peripheral surface thereof with the ring free to distort inwardly throughout the extent of the inner peripheral surface thereof, radially compressing said ring inwardly and closing the gap between the peripheral ends of said ring and radially distorting and transversely elongating said ring on an axis extending through the closed gap at said ends of said ring, applying axially inwardly directed forces to the axial end surface of said ring and holding and retaining said ring in the form established by so distorting and elongating said ring, and thereafter plating the outer peripheral surface of said ring while said ring is so closed and so distorted and elongated and so held and retained.

3. Apparatus for use in making split resilient piston rings having gaps between the peripheral ends thereof and comprising, a plurality of clamping members disposed in spaced and parallel relation and being adapted to support internally thereof a stack of said rings having the axially disposed end surfaces thereof in engagement, means pivotally supporting a pair of said clamping members about axes disposed outwardly of said ring stack and in parallel relation to said ring stack, each of said pair of clamping members being formed to engage said rings and said ring stack adjacent the opposite edges of said clamping members and in parallel relation to said axes and on one side of said ring stack and with the remotely engaging edges of said clamping members being substantially diametrically opposed across said ring stack and with the adjacently engaging edges of said clamping members being spaced between said pivotally supporting means, said pivotally supporting means providing for rotation of said clamping members in opposite directions about said axes and into acute angular relation with one another and with said remotely engaging edges tending to move freely toward one another and said adjacently engaging edges tending to move freely away from one another, a third clamping member disposed on the opposite side of said ring stack and in parallel relation to said ring stack and to said pivotally supporting means and engaging said ring stack midway between the areas of engagement of said ring stack by said pair of said clamping members, means slidably supporting said third clamping member for movement radially inwardly of said ring stack and distorting and elongating said rings on transverse axes extending through said rings and between said pair of said clamping members, a frame supporting said pivotally supporting means and said slidably supporting means for relative angular ring distorting movement of said clamping members and for acute angular movement of said pair of clamping members on said pivotally supporting means, and means mounted on said frame for moving said third clamping member radially inwardly and outwardly of said ring stack.

4. Apparatus for use in making split resilient piston rings as defined by claim 3 and in which said adjacently engaging edges of said pair of said clamping members are disposed on opposite sides of said gaps in said rings, and in which radially inwardly and outwardly movable knife edge means is provided on said frame for aligning said gaps in said rings, said means being movable outwardly of said gaps as said gaps are closed by relative movement of said clamping members.

5. Apparatus for use in making split resilient piston rings as defined by claim 4 and in which said frame supports vibrating means operable to aid in the alignment of said gaps in said rings as said gaps are closed by relative movement of said clamping members.

References Cited in the file of this patent

UNITED STATES PATENTS

| 1,494,913 | Hughes | May 20, 1924 |
| 1,498,967 | Higgins | June 24, 1924 |
| 1,541,715 | Johnson | June 9, 1925 |
| 1,619,240 | Cornego | Mar. 1, 1927 |
| 1,836,460 | Flaton | Dec. 15, 1931 |
| 1,852,529 | Koether | Apr. 5, 1932 |
| 1,996,603 | Wuerfel | Apr. 2, 1935 |
| 2,367,159 | Van der Horst | Jan. 9, 1945 |
| 2,436,227 | Phillips | Feb. 17, 1948 |
| 2,495,475 | Phillips | Jan. 24, 1950 |

FOREIGN PATENTS

| 633,457 | Great Britain | Dec. 19, 1949 |
| 620,705 | Great Britain | Mar. 29, 1949 |